United States Patent

[11] 3,591,939

| [72] | Inventors | Errol G. Payne |
| --- | --- | --- |
| | | Irvine; |
| | | Charles D. McGregor, Tustin, both of, Calif. |
| [21] | Appl. No. | 847,341 |
| [22] | Filed | Aug. 4, 1969 |
| [45] | Patented | July 13, 1971 |
| [73] | Assignee | Peripheral Data Machines, Inc. |
| | | Santa Ana, Calif. |

[54] BISTABLE DISPLAY DEVICE WITH SEQUENTIAL ACTUATOR
4 Claims, 14 Drawing Figs.

[52] U.S. Cl. .................................................. 40/28, 340/339
[51] Int. Cl. ........................................................ G09f 9/40
[50] Field of Search........................................... 35/66; 40/28 C, 52 R; 340/339, 324 R; 178/18

[56] References Cited
UNITED STATES PATENTS

| 1,745,394 | 2/1930 | Zouckermann .............. | 40/28 |
| 3,277,594 | 10/1966 | Rogers ......................... | 40/52 X |
| 3,460,276 | 8/1969 | Payne............................ | 35/66 |

Primary Examiner—Harland S. Skogquist
Attorney—Fowler, Knobbe & Martens

ABSTRACT: A display board comprising a mosaic of bistable magnetic elements is swept by a linear array of electromagnets pulsed selectively to form an image. Each magnetic element is a sealed humped duct containing magnetic powder pulled to the rear of the duct by a common magnetic erasing bar. Means are also disclosed for optically converting an image into electric pulses which are used to drive the electromagnets to reproduce that image upon the display board.

PATENTED JUL 13 1971

INVENTORS.
ERROL G. PAYNE
CHARLES D. McGREGOR
BY
FOWLER, KNOBBE
& MARTENS

ATTORNEYS.

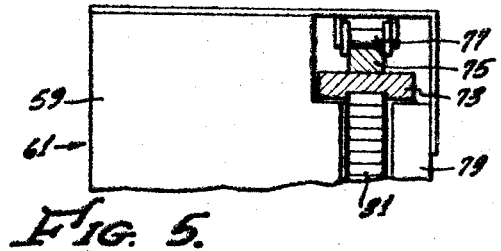
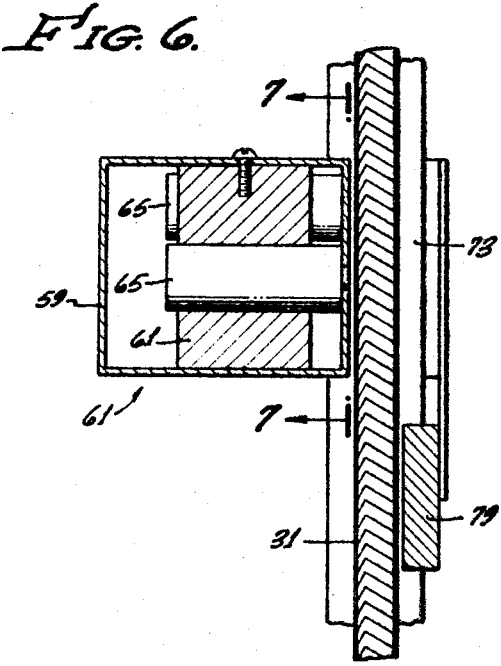
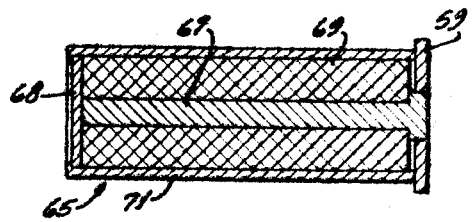
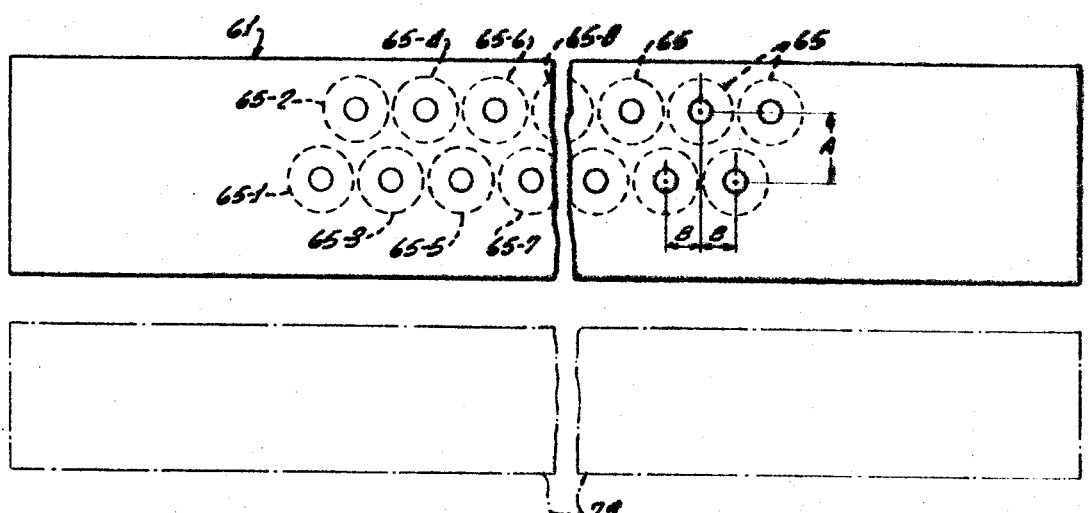

INVENTORS.
ERROL G. PAYNE
CHARLES D. MCGREGOR
BY FOWLER, KNOBBE
& MARTENS
ATTORNEYS.

BISTABLE DISPLAY DEVICE WITH SEQUENTIAL ACTUATOR

This invention relates to visual display devices and more particularly to a display device featuring a display board comprised of a large number of bistable elements upon which an image can be written or drawn under the control of remotely generated electric signals which reverse the states of selected ones of the elements.

A preferred embodiment of the board is disclosed and claimed in copending application, Ser. No. 762,202 filed Sept. 16, 1968, and now U.S. Pat. No. 3,460,276 by Errol G. Payne and entitled "Bistable Visual Display Device." Briefly, the display board includes a light-transmitting front wall and a rear wall. Extending between the front and rear walls is an array of closed, mutually isolated ducts humped along their longitudinal axes. A charge of opaque material fills each of the ducts partially, and each charge is capable of flowing through its respective duct from one of the walls to the other. As explained in the above-referenced application, the material is advantageously a magnetic powder which tends to lodge stably at either one end or the other of the duct in which it is contained. The magnetic powder may be readily moved from one of its stable positions to the other by a simple magnet.

In the above-referenced patent application the humped ducts are shown to be symmetrical, having opposing slopes inclined at the same angle relative to the walls terminating them. It has been discovered that the performance of the display board can be improved by the use of asymmetrical ducts so configured that there is a difference of at least 10° between the angles included by the respective slopes and the terminating walls which those slopes face. Such a display board is disclosed herein as a preferred element of a system incorporating features of the present invention. However, it is not the joint invention of the applicants alone and it therefore not claimed herein. Instead, it is claimed in a copending application to be filed by Errol G. Payne, Charles D. McGregor, Paul T. Swarts, Gary L. Conley, Edward J. Divinski and to be assigned to Peripheral Data Machines, Inc., the assignee of the present invention.

The broader aspects of the system disclosed herein are claimed in a copending patent application filed by Errol G. Payne, entitled "Bistable Visual Display Device With Scanning Actuator" and assigned to Peripheral Data Machines, Inc. The present application is more specifically directed to the configuration of the scanning actuator and to a time-sharing arrangement for sequentially energizing individual elements of the actuator.

In accordance with a feature of the present invention, the means for concurrently setting a plurality of bistable elements comprises an array of electromagnets arranged in mutually staggered rows extending across the surface of the board in a first direction, each electromagnet moving, when energized, magnetic material in a different group of adjoining ducts relative to the light-transmitting front wall of the board. Means are provided for causing the array of electromagnets to move along the board in a second direction. While so moving, selected combinations of the electromagnets are successively actuated in order to cause the charges of magnetic material which have been moved in their respective ducts which may be nonadjacent, to form a predetermined pattern.

The invention finds particular utility in reproducing an image from a master sheet. More particularly, a master sheet is moved relative to an array of photoelectric sensing means adapted to produce a plurality of electric signal collectively representing a portion of the image upon the master sheet. These signals are then applied to respective ones of the electromagnets which are moved relative to the display panel in synchronism with the motion of the master sheet relative to the photoelectric sensing means.

In accordance with another feature of the invention, the outputs of the photoelectric sensing means are applied to the electromagnets by a commutator in such a manner that the outputs of successive groups of the photoelectric sensing means are applied sequentially to corresponding groups of the electromagnets so as to reduce the total number of wire connections required between the sensing means and the electromagnets.

The present invention and its advantages will be more clearly understood with reference to the following description of a preferred embodiment thereof taken in conjunction with the accompanying drawings in which:

FIG. 5 is a top view, partially cut away, of the display unit portion of the system shown in FIG. 1;

FIG. 6 is a cross section through the display unit shown in FIG. 1 along lines 6—6;

FIG. 7 is a view of the array of electromagnets forming part of the display unit shown in FIG. 1;

FIG. 8 is a cross section through one of the electromagnets shown more generally in FIGS. 6 and 7;

Figure 1:
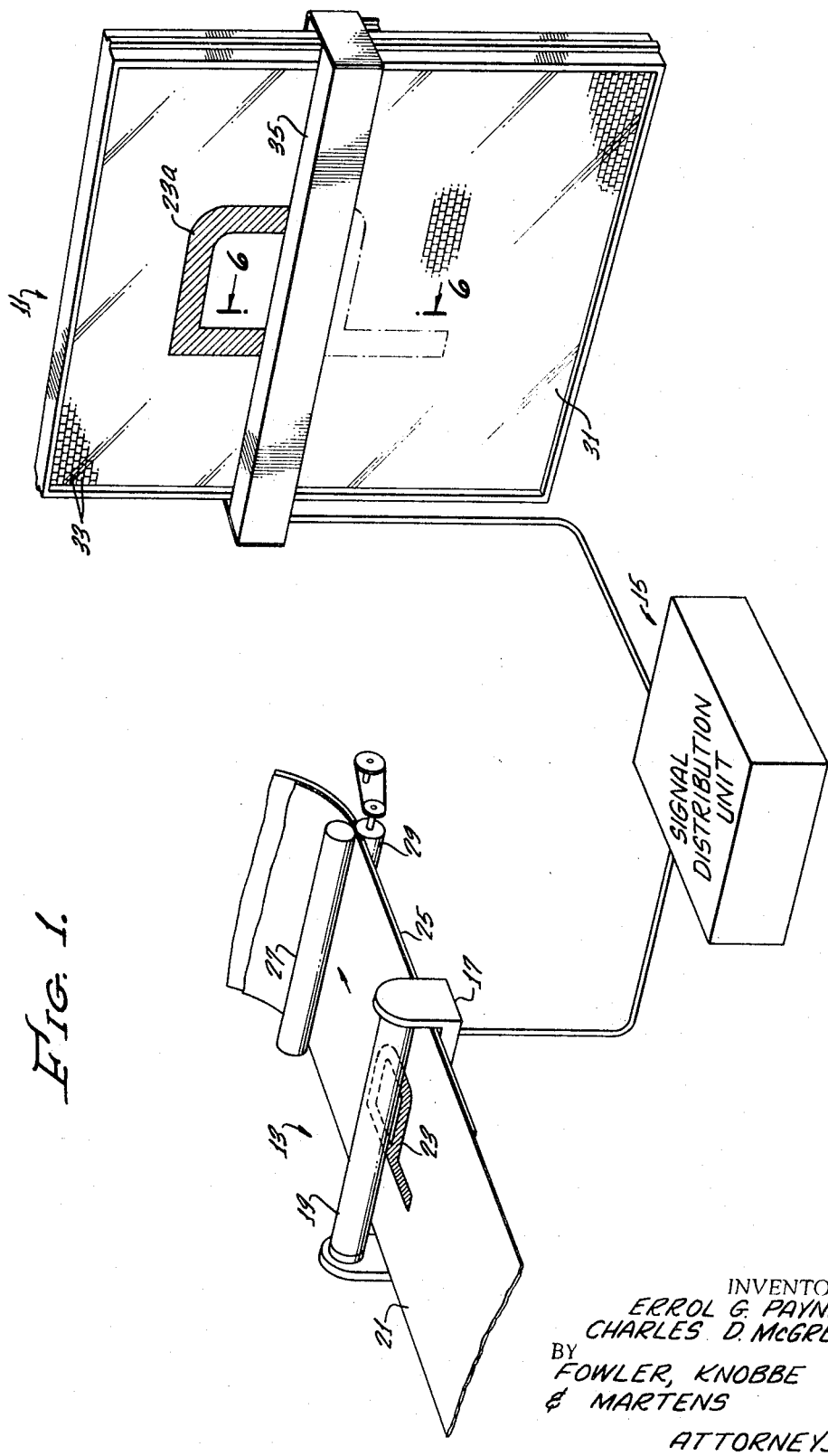
FIG. 1 is a perspective view of a facsimile transmission system incorporating features of the invention.

The general organization of a facsimile transmission system incorporating features of the present invention is shown in FIG. 1. The system is comprised of a display unit 11, a facsimile-scanning unit 13, and means 15 for applying the electric signals produced by the scanning unit 13 to the display unit 11.

The scanning unit 13 includes a fixture 17 housing a light source 19 and an array of photoelectric means (not shown in FIG. 1) extending opposite the light source 19 and adapted to produce a plurality of electric signals representative of an image passed between the light source 19 and the photoelectric sensing means. A master sheet 21, carrying an image 23 is drawn along a guide 25 between the light source 19 and the photoelectric sensing means by a pair of rollers 27 and 29, the latter of which is driven by a suitable motor (not shown). In this way the rollers 27 and 29 cause the master sheet 21 to be scanned by the photoelectric sensing means. The display unit 11 is principally comprised of a display board 31 having a plurality of bistable elements 33. Extending across the face of the board 31 is a writing bar 35 housing an array of actuators (not shown in FIG. 1), each actuator being adapted to reverse the state of a selected group consisting of at least one of bistable elements 33 in response to an electric signal from a respective one of the photoelectric sensing means housed in the fixture 17.

As the master sheet 21 passes the photoelectric sensing means, an image 23a is caused to appear on the face of the board 31 by scanning it with the array of actuators housed in the bar 35 in synchronism with the scanning of the master sheet 21 by the photoelectric sensing means.

The more detailed discussion of an exemplary system which follows is directed to the system shown generally in FIG. 1. It should be understood, however, that the electric signals used to control the actuators housed in the bar 35 could also be produced by means other than a master sheet and an array of photoelectric sensing means. For example, the signals could be produced under the control of a suitably programmed computer.

Figure 2:
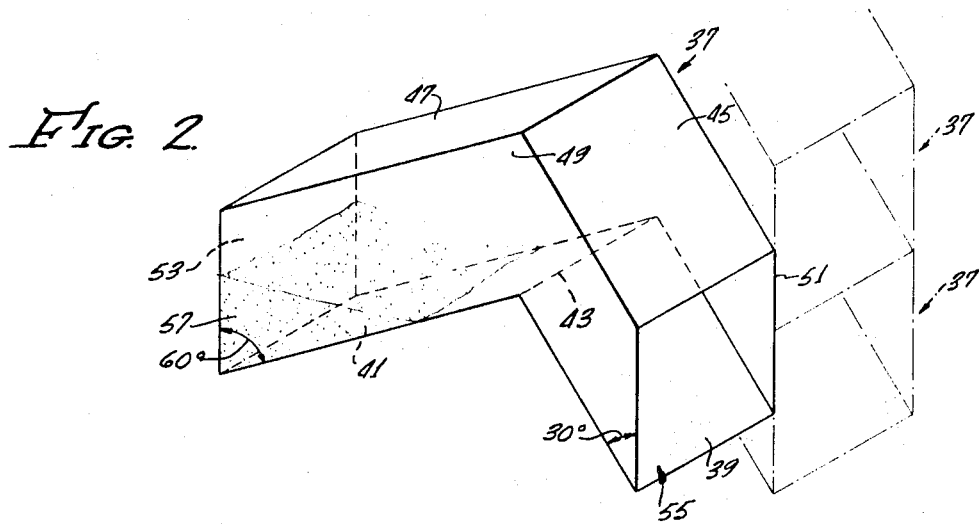
FIG. 2 is a perspective diagram showing a single bistable duct of the type used in a preferred version of the display unit shown in FIG. 1, with the charge of powder contained in the duct being confined to its rear portion, representing the erased state of the duct.
Figure 3:
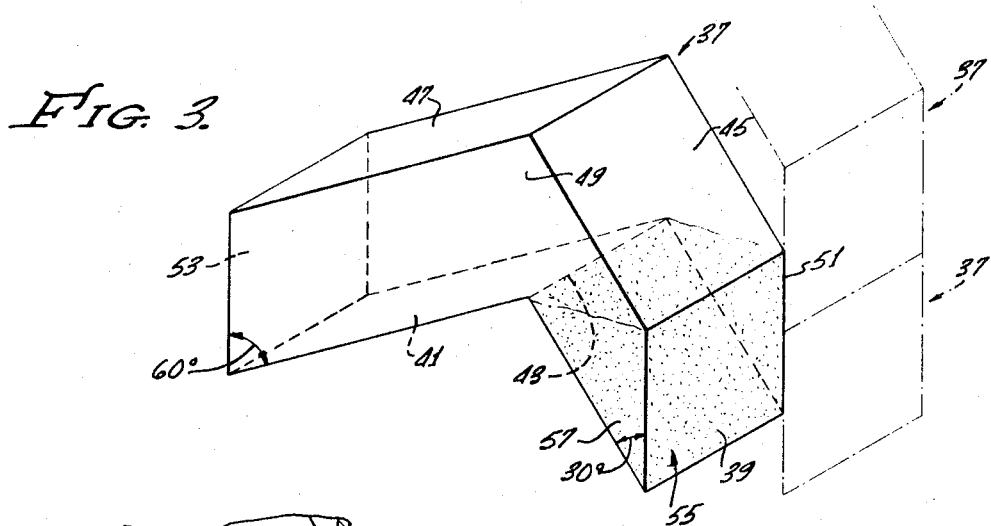
FIG. 3 is a view of the duct shown in FIG. 2, but with the charge of powder in its front portion, to illustrate the displaying state of the duct.

A preferred form of the bistable elements 33 is illustrated in greater detail in FIGS. 2 and 3. They correspond to FIGS. 3 and 4 of the referenced application except that, in the referenced application the bistable elements are shown as having symmetrical ducts, whereas the ducts are shown herein as being asymmetrical. In particular, the floors of the front and back portions of the ducts are shown to be inclined at 30° and 60° with the front and back walls of the board respectively. In other respects the display board described herein corresponds to that disclosed in greater detail in the related application and reference may be made thereto for additional details concerning a preferred method of manufacturing the display board. While the asymmetrically sloped duct represents a preferred form of the display board per se, it should be understood that the features of the present invention, which relate to the setting a plurality of bistable display board elements to a given one of their stable states, as by an array of electromagnets, are also applicable to a system wherein the display board has symmetrically sloped ducts, as disclosed in the referenced application.

Figure 4:
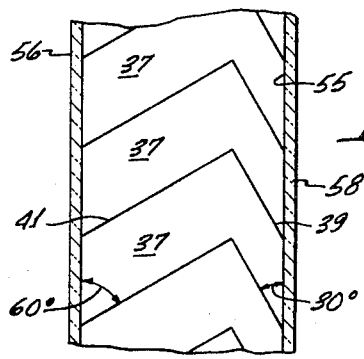
FIG. 4 is a cross section through a portion of the display board shown in FIG. 1.

Referring to FIG. 2, in the preferred embodiment of the display board each bistable element is comprised of a closed duct 37 extending transversely through the board 31. It is a characteristic of the preferred method disclosed in the referenced application that it produces mutually staggered column of ducts as shown in FIGS. 2 and 3. The duct 37 is comprised of a pair of oppositely inclined slopes 39 and 41 meeting at common peak 43. The slopes 39 and 41 form the floor of the duct 37 which also includes a corresponding pair of sloped surfaces 45 and 47 forming the roof of the duct. A pair of walls 49 and 51 connect the floor portions 39 and 41 to the roof portions 45 and 47. The rear ends 53 of the ducts 37 are terminated by a rear wall 56 which may be integral with the panel but which is usually bonded thereto as a separate member. This wall may or may not be transparent. The front ends 55 of the ducts 37 are bonded to and terminated by a transparent front panel 58. Neither the back nor the front panel is shown in FIGS. 2 and 3, for sake of clarity. Instead, they are shown in FIG. 4, which is a cross section through a portion of the board 31.

Confined within the rear portion of the duct 37 in FIG. 2 is a charge of material 57 which could be a liquid but which in the preferred embodiment of the invention is a powder. In FIG. 2 the powder 57 is shown in the position which it occupies when the board 31 is erased. It may be caused to assume that position by tilting the panel horizontally, which will cause the duct 37 to be turned to a position at 90° from that shown in FIG. 2. However, in accordance with a specific feature of the present invention the board is erased by means of a bar magnet which is drawn across the rear face of the board in a manner which will be explained subsequently. Erasure of the board either by tilting or by means of a magnet will cause all of the powder 57 in the duct which may have been on the front slope 39 to slide toward the rear, over the peak 43, and onto the rear slope 41 of the duct. After the erasing operation has been completed, the powder 57 remains in the rear of the ducts in the position shown in FIG. 2. This is the first stable position of the bistable elements 33 comprised of the ducts and the powder 57 therein.

Advantageously, when the board 31 is erased, the front of the ducts is clear and free of powder so that from a conventional viewing position the ducts 37 assume the color of their inside surfaces 39, 49, 51. In practice, the level of powder will be kept below the peak 43 so as to prevent the powder in the rear portion of the duct 37 from spilling over into its front portion when the board 31 is slightly tilted from a perfectly vertical position. All that is necessary is to place enough powder in the duct 37 so that when the powder is drawn forward it substantially covers the front 55 of the duct.

To insure that the powder 57 in the rear of the duct 37 is not visible from the front from any viewing angle, the duct is so configured that no portion of its rear 53 is visible from its front 55. In particular, the sloped floor 39 of the duct rises at a sufficiently steep angle and is sufficiently long relative to the height of the front end 53 of the duct 37 so that the floor 39 rises at least as high as the top of the front 55. Moreover, in order to prevent powder from spilling over from the rear of the duct to its front when that ducts is in the erased condition, the rear portion of the duct 37 is made larger than the front portion. This is achieved by making the front slope 39 steeper than the rear slope 41. Thus, as best seen in FIG. 4, each of the ducts 37 includes a pair of oppositely inclined sloped sections 39 and 41 originating from and facing respective ones of a light-transmitting front wall 58 and a rear wall 56 and characterized by a substantial (i.e. at least 10° of arc) difference between the angles included by the respective sloped section 39 and 41 and the walls which those sloped sections face. In FIG. 4, where the angles included by the front and rear slopes 39 and 41 and the walls 58 and 56 which they face are shown as 30° and 60° respectively, the difference is 30°.

The duct 37 is shown with its charge of powder 57 in its second stable state in FIG. 3. To transport the powder to this state from its previous state at the rear of the duct 37, a transverse force is applied to it which may be either a repelling force applied at the rear 53 or, as explained with reference to FIG. 1, an attracting force applied at the front 55 by means of electromagnets.

With the proper amount of powder 57 in the duct 37 its entire front 55 is covered with the powder when the latter has been transferred into its second stable position. And due to the continuous downward force of gravity, the powder will remain there even after the transverse force has been removed.

In keeping with the invention, means are provided for concurrently urging toward a given one of the walls 56 and 58 the material 47 contained within a desired plurality of the ducts 37. The writing bar 35 is a preferred embodiment of such a means and is shown in greater detail in FIGS. 5 through 9. It will be recalled from the brief description of the scanning unit 13 that the fixture 17 carries a linear array of photoelectric sensing means for producing a plurality of electric signals collectively representing a portion of the image 23 carried upon the master sheet 21. The writing bar 35 carries a linear array of electromagnets, each corresponding to a respective one of the photoelectric sensing means carried by the fixture 17, and each moving the magnetic powder in a selected group, consisting of at least one duct, from one of its stable positions to the other in response to a signal from a respective one of the photoelectric sensing means. As shown in FIG. 6, the writing bar 35 includes housing 59 within which there extends a bracket 61 containing two rows of staggered bores 63 for retaining a plurality of electromagnets 65 in a linear array.

As shown in FIG. 7, electromagnets electromagnets 65 are arranged in two staggered rows so that, progressing from left to right, successive ones of the electromagnets are in alternate ones of the two rows. This arrangement permits closer lateral spacing of the electromagnets than would be possible if they were all in a single row. With the writing bar 35 arranged for scanning the display board 31 vertically, each of the two rows of electromagnets is assigned to write upon a respective vertical strip of the display board and the successive electromagnets in the two rows may be placed sufficiently close so that there is no "dead space" between them.

As the writing bar 35 is transported across the face of the display board 31, selected ones of the electromagnets 65 are electrically actuated to cause any desired image to be displayed upon the board. It will be understood that the electromagnets 65 could be arranged in a single row where close lateral spacing is not desired. Conversely, the electromagnets may be arranged in more than two rows for even better resolution in some applications.

Each electromagnet 65 includes a central core 67 of magnetic material surrounded by a winding 69 and having a disc-shaped rear end 68 snugly fitting into and surrounded by an outer cylinder 71 of magnetic material to form a low-reluctance flux path therewith (FIG. 8). It will be understood, of course, that the electromagnets may take other configurations. For example, the magnetic cylinder 71 and the disc-shaped rear end 68 may be entirely eliminated. Their function is to focus the lines of magnetic force generated by the electromagnets so as to exert maximum force upon the powder in the ducts 37. However, electromagnets have worked satisfactorily in this application without such focusing cylinders.

Figure 9:
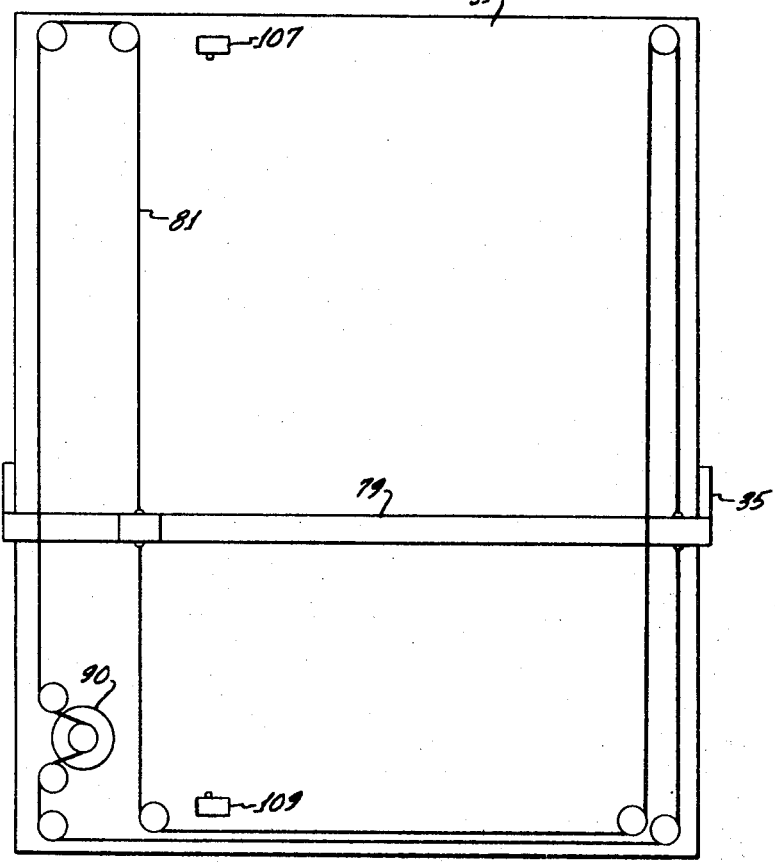
FIG. 9 is a diagrammatic view of the rear of the display unit shown in FIG. 1 in order to illustrate a suitable arrangement for moving the array of electromagnets smoothly along the display board.

A frame 73 runs around the borders of the board 31 and a pair of guide rails 75 extend along the vertical portions of the frame (as shown in FIG. 1) for guiding the movement of the bar 35 which is provided with a pair of rollers 77 for this purpose. Attached to the writing bar 35 is a bar magnet 79 which extends across the back face of the board 31 parallel to but laterally displaced from the linear array of electromagnets 65 (FIG. 6). A suitable arrangement for driving the writing bar 35 and the erasing magnet 79 across the board 31 is illustrated in FIG. 9. It comprises principally an endless chain 81 trained around a series of pulleys mounted upon the back of the board 31 and driven by a motor 90.

Figure 10:
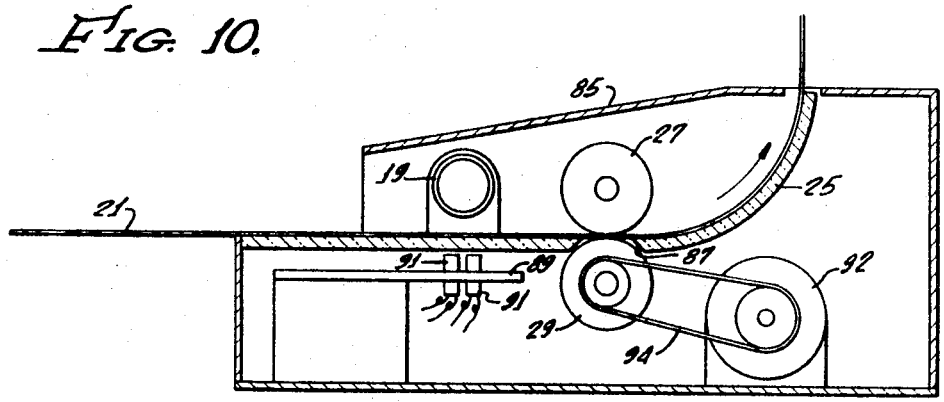
FIG. 10 illustrates diagrammatically an arrangement for scanning a master sheet photoelectrically so as to generate a set of signals to be used for driving the array of electromagnets.
Figure 11:
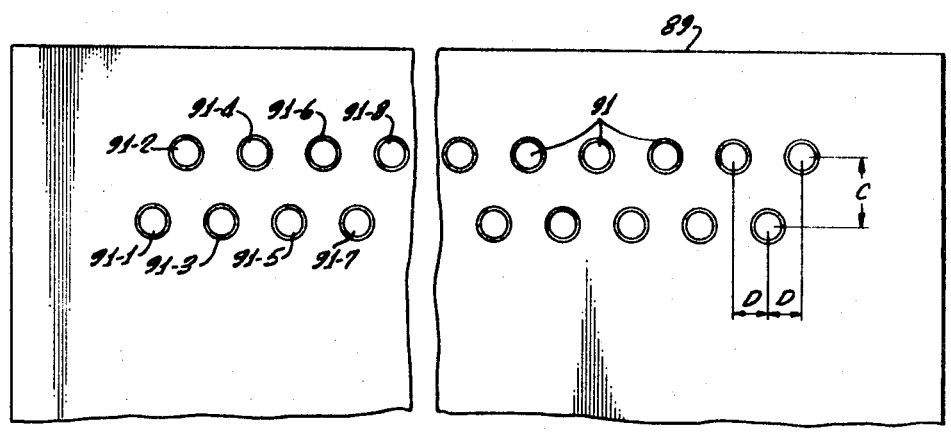
FIG. 11 is a top view of the support bracket forming part of photoelectric scanning arrangement shown in FIG. 10 and it shows the layout of a plurality of photoelectric sensing means for scanning the master sheet.

Turning next to the scanning unit 13, a suitable unit is shown in FIGS. 10 and 11. The guide plate 25 shown previously in FIG. 1 is enclosed in a housing 85 and is made of a transparent material so as to transmit light from the light source 19. A slot 87 extends in the guide 25 between the rollers 27 and 29 to permit the master sheet 21 to be gripped between the rollers and to be transported thereby past the light source 19 under the urging of an electric motor 92 coupled to the drive roller 29 through a belt 94. Mounted below the guide plate 25 upon a support bracket 89 is a linear array of photoelectric sensing means 91.

It is the function of the photoelectric sensing means 91 to generate electric signals representative of that portion of the image 23 on the master sheet 21 which passes between the sensing means 91 and the light source 19. In the illustrated embodiment of the invention the master sheet is a transparent photopositive on which the image 23 is opaque. The photoelectric sensing means are photodiodes which put out a given signal when they are illuminated and a diminished signal when they are not. The photodiodes are distributed in two rows, with the photodiodes in the respective rows being staggered in the same manner as are the electromagnets 65 (Compare FIGS. 7 and 11).

Figure 12:
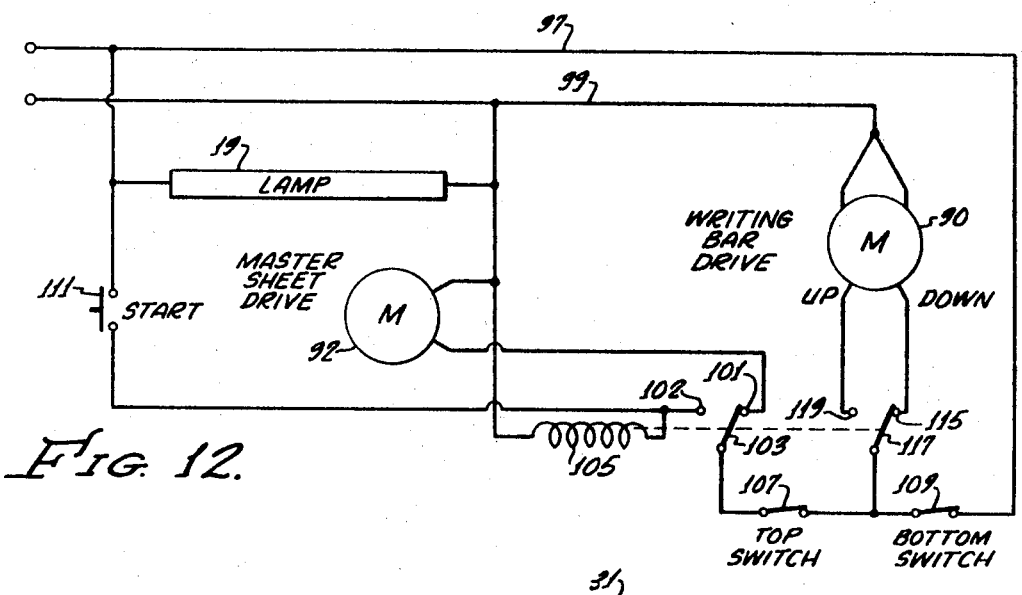
FIG. 12 is a schematic diagram of a system for moving the array of electromagnets across the display board and the master sheet past the photoelectric sensing means in mutual synchronism.

FIG. 12 shows an exemplary control circuit for synchronously moving the master sheet 21 relative to the array of photoelectric sensing means and the array of electromagnets relative to the board 31. The light source, or lamp, 19 is connected across a pair of power supply lines 97 and 99 directly. The paper drive motor 90 is connected across the same two lines 97 and 99 through normally closed contacts 101 and 103 of a relay 105 and through a pair of normally closed limit switches 107 and 109. The switches 107 and 109 are located at the top and bottom of the board 31 respectively (also see FIG. 9) and are mounted to be opened when the writing bar 35 reaches the opposite ends of its travel across the board. The relay 105 is connected across the supply lines 97 and 99 through a start switch 111.

One lead of the writing bar drive motor 90 is connected to the supply line 99. A second, UP input, lead of the motor is connected through stationary contact 115 and movable contact 117 of the relay 105 and through the bottom limit switch 109 to the other supply lead 97. Finally, a third, DOWN input, lead of the motor is connected through another stationary contact 119, the movable contact 117, and the switch 109 to the supply line 97.

Normally, when the relay 105 is not energized, the movable contact 117 rests against the stationary contact 115 and, provided the switch 109 is closed, this will cause the motor 90 to move the writing bar 35 downward. Conversely, when the relay 105 is energized, the movable contact 117 is transferred into engagement with the stationary contact 119, causing the motor 90 to reverse its direction of rotation and to move the writing bar 35 upward.

In its initial position the writing bar 35 rests against the bottom limit switch 109, causing it to open, thereby cutting off power from the drive motor 90. Operation is initiated by depressing the start switch 111 through which power is then applied to the coil of the relay 105 which transfers its movable contact 117 against the stationary contact 119, causing power to be applied to the UP input of the motor 90 through the normally closed top limit switch 107, contacts 102 and 103 of the relay 105, and through the start switch 111. As a result, the motor 90 begins to drive the writing bar 35 upward, thereby lifting it off the bottom limit switch 109 so as to allow it to close. The start switch 111 may now be released since the relay 105 will remain energized through its contacts 102, 103, and through the now closed limit switches 107 and 109. Similarly, the motor 90 will continue to be energized through contacts 119 and 117 of the relay 105 and through the now closed bottom limit switch 109. The writing bar 35 will continue to travel upward until it hits the top limit switch 107. When this occurs, the limit switch 107 opens and cuts off power from the relay 105, which then releases its movable contacts 103 and 117. This has two effects. First, power is now applied through the bottom limit switch 109 to the DOWN input of the motor 90 through the stationary contact 115 of the relay 105. As a result, the motor 90 reverses its direction of rotation and begins to drive the writing bar 35 downward. Secondly, as soon as the writing bar 35 beings to travel downward, the top limit switch 107 again closes and power is then applied through the limit switches 107 and 109 and through the contacts 101, 103 of the relay 105 to the drive motor 92 of the optical scanner 13. Thus, as soon as the writing bar begins to move downward across the display board 31, the master sheet 21 begins to move past the photoelectric sensing means 91 in synchronism with the movement of the electromagnets 65 across the display board 31.

The absolute speed at which sheet 21 is transported past the photodiodes 91 and at which the electromagnets 65 are transported across the face of the display board 31 are not critical. However, their speeds relative to one another are determined by the spacing between the successive rows of photodiodes relative to the spacing of the successive rows of electromagnets. Thus, for example, in a device which was built substantially as described herein included two rows of 44 electromagnets 65, shown as the dimension "A" in FIG. 7, of 0.5 inches and a corresponding spacing between the two rows of 44 photodiodes 91, shown as the dimension "C" in FIG. 11, of 0.2 inches. The dimensions B and D, representing the lateral spacing between adjacent electromagnets 65 and photodiodes 91 respectively were 0.25 and 0.10 inches, consistent with the 2.5 to 1 ratio between the dimensions A and C. The scanning speed for the writing bar 35 was selected to be 1 inch per second. Consequently, the speed of travel for the sheet 21 past the photodiodes 91 was selected to be 0.4 inches per second. In other words, the ratio between the speed of travel of the sheet 21 relative to the photodiodes 91 and the speed of travel of the electromagnets 65 relative to the display board 31 is determined by the ratio of the distance C between adjacent rows of the electromagnets 65, to the distance A between adjacent rows of the photodiodes 91.

In the device just referred to, the outer diameter of the electromagnets 65 was 0.445 inches, the thickness of the display board 31 was 0.280 inches, and the distance between the front face of the display board 31 and the electromagnets 65 was 0.050 inches. The cross-sectional area of the ducts 37 in the display board 31 used was approximately 0.1×0.1 inches, considerably smaller than that of the individual electromagnets 65. As a result, each electromagnet 65 was operative to move the magnetic powder in a selected group of adjacent ducts from one of their stable positions to the other in response to a signal from a respective one of the photoelectric sensing diodes 91. This relationship need not necessarily be so, however, and, by reducing the cross-sectional dimension of the electromagnets 65 and placing them closer to one another, or by increasing the cross-sectional dimensions of the ducts 37 to a size comparable to that of the electromagnets 65, each electromagnet could be made to move the magnetic powder in a single one of the ducts 37.

Figure 13:
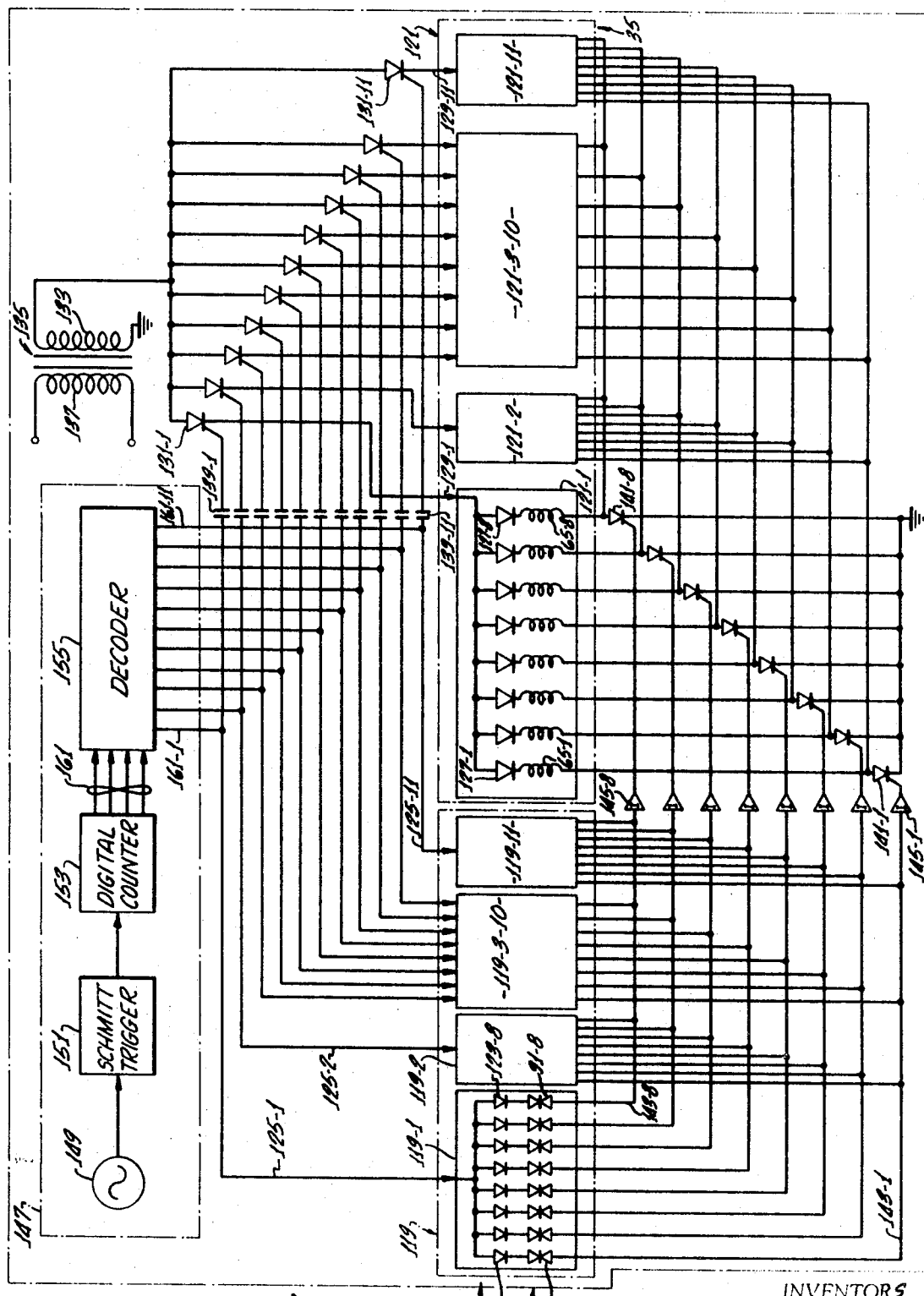
FIG. 13 is a schematic diagram of a system which includes the photoelectric sensing means, the electromagnets, and a commutating means for successively applying the outputs of respective groups of the photoelectric sensing means to corresponding groups of the electromagnets.

By virtue of its position in the array, each electromagnet 65 serves to reproduce a portion of the image 23 upon the sheet 21 detected by a particular one of the photodiodes 91. This one-for-one correspondence is indicated by the suffixes 1 through 8 attached to reference numerals 65 and 91 in FIGS. 7 and 11. It will be apparent that the coil of each electromagnet 65 could be connected directly to the corresponding photodiode 91 in the optical scanner 13. It is a feature of the present invention, however, that the outputs of the photodiodes 91 are applied to their corresponding electromagnets 65 over a fraction of the lines which would be required with a direct connection. This is achieved by a time-sharing system, a preferred embodiment of which is shown in FIG. 13. Generally, the system includes an optical sensing circuit 119 which includes the photodiodes 91, and an electromagnetic actuating assembly 121 which includes principally the electromagnets 65. The 88 photodiodes 91 are divided into 11 groups of eight each. The first of these groups is shown in detail as parts of block 119-1. The second and last groups are shown in block form as elements 119-2 and 119-11. The third through the 10th groups are shown collectively as the block 119-3-10. The 88 electromagnets 65 are divided into 11 corresponding groups and these groups are identified in FIG. 13 in the same manner as the photodiodes.

The outputs of successive groups of the photodiodes 91 are sequentially applied over a single set of lines to corresponding groups of the electromagnets 65. As the description of the time-sharing arrangement proceeds, it will become apparent that it could be used to equal advantage in a system in which the display signals originate from a source other than an array of photodiodes. For example, if a computer were used, successive signal groups on a single set of outputs could be applied by the arrangement disclosed herein sequentially to successive groups of the electromagnets.

Respective ones of the photodiodes 91-1 through 91-8 are individually connected through a series of isolating diodes 123-1 through 123-8 to a common line 125-1, over which an electric potential may be applied to the set of photodiodes 91-1 through 91-8. In a similar arrangement each of the eight electromagnets 65-1 through 65-8 is individually connected through a respective isolating diode 127-1 through 127-8 to a common supply line 129-1, over which an electric potential may be applied to all of the electromagnets 65-1 through 65-8 in the first group. Respective ones of the diodes 127-1 through 127-8 are mounted upon the bracket 61 next to respective ones of the electromagnets 65-1 through 65-8 to which they are individually connected. Power is supplied to the line 129-1 through a silicon-controlled diode (SCR) 131-1 from the secondary winding 133 of a power transformer 135 whose primary winding 137 may be connected to a source of standard 60-cycle 110-volt current. The control electrode of the SCR 131-1 is connected through an isolating capacitor 139-1 to the supply line 125-1 so that power is supplied through the SCR 131-1 to the eight electromagnets 65-1 through 65-8 concurrently with the supply of power to the eight photodiodes 91-1 through 91-8.

The 10 groups of photodiodes represented by the blocks 119-2 through 119-11 are similarly controlled through a series of 10 lines 125-2 through 125-11 and in the same fashion the remaining 10 groups of electromagnets represented by the blocks 121-2 through 121-11 are similarly controlled through a series of 10 SCR's 131-2 through 131-11 so that successive groups of electromagnets 65 are energized concurrently with the corresponding groups of photodiodes 91.

Turning again to the first group of eight electromagnets 65-1 through 65-8, each of them is individually controlled by a respective SCR 141-1 through 141-8. Thus, referring in particular to the first electromagnet 65-1, it is connected to ground through the anode-cathode circuit of the SCR 141-1. To cause the electromagnet 65-1 to become actuated in response to the electric signal from the corresponding photodiode 91-1, the output of that photodiode is connected over a line 143-1, and through an inverting amplifier 145-1, to the control electrode of the SCR 141-1. Therefore, provided that an enabling signal has been applied to the supply line 125-1, and provided that the photodiode 91-1 is cut off from the light source 19 by a portion of the opaque image 23, a signal will be applied to the SCR 141-1 so as to close the circuit between ground and the first electromagnet 65-1. The enabling signal on the line 125-1 will also cause the SCR 131-1 to close the circuit between the secondary winding 133 of the transformer 135 and the electromagnet 65-1 so that the electromagnet is actuated and moves the magnetic powder toward the front of the display board 31 in those of the ducts 37 which are within the area affected by that electromagnet.

Each of the remaining ten groups of electromagnets 121-2 through 121-11 is connected to ground through the eight SCR's 141-1 through 141-8 in the same manner as the first group 121-1. Thus, in each group 121-2 through 121-11 successive ones of the electromagnets are respectively connected through the SCR's 141-1 through 141-8 to ground. Moreover, in a manner similar to the connection of the first group of eight photodiodes 119-1, each of the remaining ten groups represented by the block 119-2 through 119-11 is connected to the output lines 143-1 through 143-8, so that the first photodiode in each of the eleven groups is connected to the first signal output line 143-1 and the second, third through the eighth photodiode in each of the groups of photodiodes is connected to the second, third through eighth of the output lines 143-2 through 143-8. In this manner, each group of the 11 groups of eight photodiodes is connected to control each group of the 11 groups of eight electromagnets. However, by means of a time-sharing control circuit to be described next, the respective groups of photodiodes and the respective groups of electromagnets are enabled successively so that at any one time only one group of electromagnets is operatively responsive to its corresponding group of photodiodes. This time-sharing function is performed by a timing control unit 147 which includes a 60 c.p.s. voltage source 149, a Schmitt trigger 151, a digital counter 153 and a decoder 155.

Figure 14:
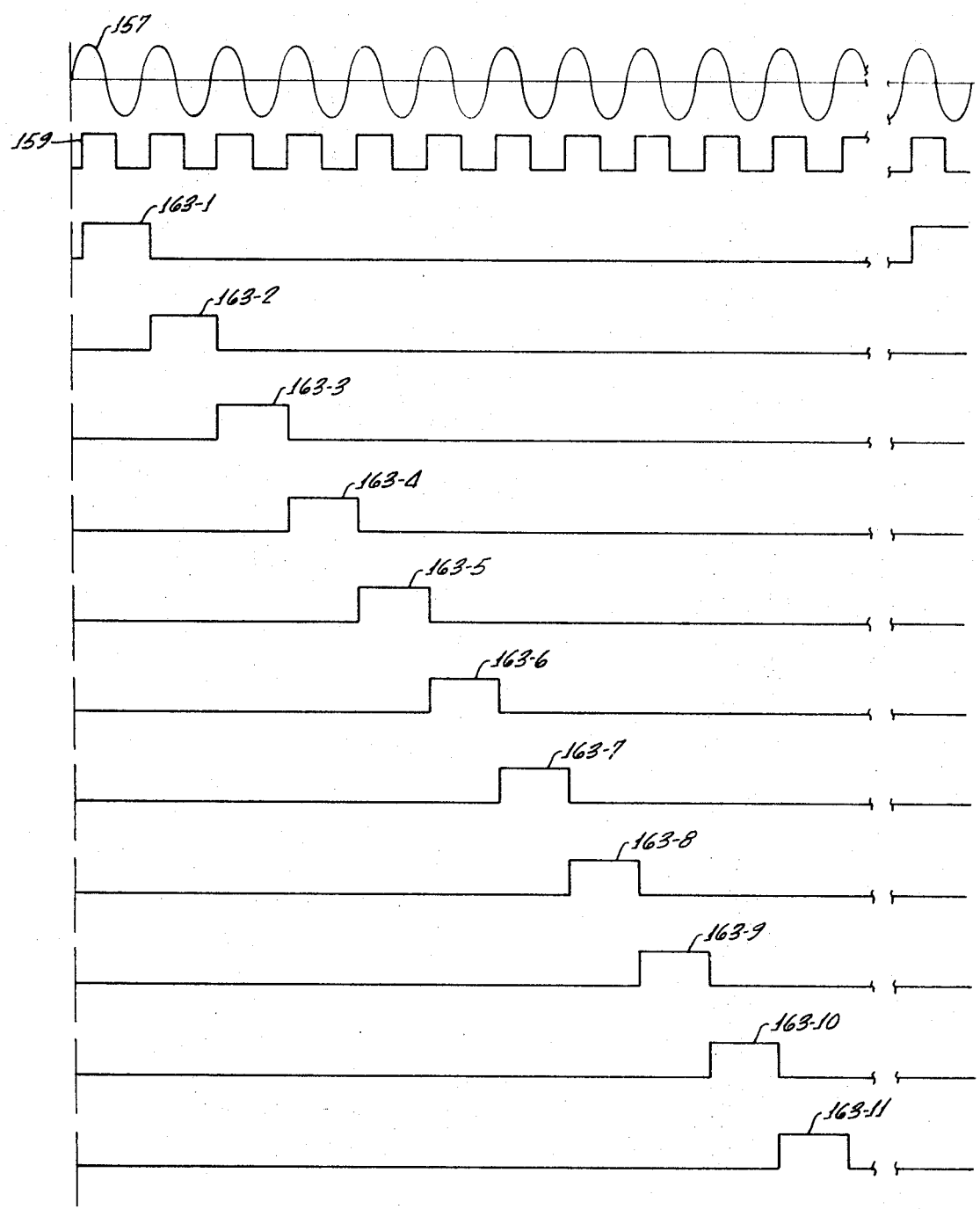
FIG. 14 illustrates the waveforms appearing at selected points in the system of FIG. 13.

The operation of the timing control unit 147 will be understood more readily with reference to FIG. 14, which shows the waveform generated by various elements of the unit. A 60-cycle waveform 157 produced by the source 149 is converted into a square wave train 159 by the Schmitt trigger 151 and is used to drive the digital counter 153 which is designed to have at least 15 binary states. The outputs of the digital counter 153, appearing on four lines identified collectively as 161, are applied to the inputs of the decoder 155 having a series of 11 outputs 161-1 and 161-11. Respective ones of these outputs are individually connected to respective ones of the lines 125-1 through 125-11 for successive actuation of corresponding groups of photodiodes 91 and electromagnets 65. The operation of the elements 151, 153, and 155 is well known to those skilled in the art and will not be explained here further. It will be sufficient to note that, with each cycle of the sine wave 157 being applied to the Schmitt trigger 151 a signal will appear on a successive one of the decoder outputs 161-1 through 161-11. These signals are represented in FIG. 14 by the waveforms 163-1 through 163-11. During the four cycles of the sine wave 157 which follow the cycle during which the signal 163-11 appears on the decoder output 161-11, the digital counter 153 is stepped through its 12th, 13th, 14th, and 15th count states without any further signals appearing on the outputs of the decoder 155. Then, during the next cycle of the sine wave 157 the digital counter is reset its initial count state and the signal 163-1 appears on the output 161-1 of the decoder 155 and the cycle then repeats itself. In this manner successive groups of photodiodes 91 are concurrently enabled along with corresponding groups of electromagnets 65.

Each group of photodiodes and corresponding electromagnets remains energized for a sixtieth of a second and the entire cycle during which all groups of photodiodes and electromagnets are enabled is completed in a quarter of a second, so that the array of photodiodes and electromagnets are successively enabled in a sweeping fashion four times each second. This particular frequency is a function, first of the speed with which the electromagnets 65 are transported across the face of the display panel 31 during the displaying operation, and secondly of the lateral distance "B" between adjacent ones of the electromagnets. In the model referred to previously with reference to FIG. 7, the lateral distance "B" was selected to be a quarter of an inch. It will be recalled that the electromagnets were transported across the face of the display board 31 at a speed of 1 inch per second. Consequently, if a square grid type of display is to be generated that is, if adjacent dots on the display board 31 are to be the same distance apart vertically as they are horizontally, each electromagnet 65 must be enabled four times every second. Hence, the frequency of four enabling pulses per second to each group of electromagnets 65.

A display operation is initiated by depressing the start switch 111 (FIG. 11) which energizes the relay 105 and applies power to the motor 90 to drive the writing bar 35 upward. As the bar 35 moves upward, the erasing magnet 79 pulls the powder toward the rear in all of the ducts 37 which it traverses so that at the end of the travel of the writing bar 35 the display panel 31 is completely erased. When the writing bar 35 has reached the end of its travel at the top of the display board 31 it opens the top limit switch 107, causing the relay 105 to release, power to be applied to the sheet drive motor 92, and power to be applied to the electromagnet drive motor 90 so as to drive it in the opposite direction, moving the writing bar 35 downward across the display board 31. As the writing bar 35 moves downward along the display board 31, the erasing magnet 79 precedes the electromagnets 65 and pulls toward the rear of the ducts 37 any minute quantities of the magnetic powder 57 which may have been left in the front portion of those ducts during the upward sweep of the magnet. Synchronously with the downward sweep of the writing bar 35, the master sheet 21 is transported past the photodiodes 91, to be scanned thereby. During the first count state of the digital counter 153 the waveform 163-1, appearing on the first output line of 161-1 of the decoder 155, momentarily (e.g. one-sixtieth of a second) and concurrently enables the first set of eight photodiodes 91-1 through 91-8 as well as the first set of eight electromagnets 65-1 through 65-8. As the image 23 passes between the light source 19 and the photodiodes 91 signals will be transmitted over the lines 143-1 through 143-8 by those of the eight photodiodes 91-1 through 91-which receive light from the light source 19. Conversely, a signal is not transmitted during the first count state of the digital counter 153 by those of the photodiodes 91-1 through 91-8 over which the image 23 passes.

Due to the action of the inverters 145-1 through 145-8, those of the electromagnets 65-1 through 65-8 which correspond to those of the photodiodes 91-1 through 91-8 over which a portion of the image 23 has passed will be actuated momentarily and the remaining ones of those electromagnets, corresponding to those of the photodiodes 91-1 through 91-8 over which no portion of the image has passed remain inactive. In this way powder is momentarily and concurrently pulled forward in selected ones of the ducts 37 so as to reproduce the first scanned portion of the image 23.

During the next sixtieth of a second, marked by the second state of the digital counter 153, the waveform 163-2 appearing on the output 161-2 of the decoder 155 enables the second group of eight photodiodes, represented by the block 119-2 and also enables the second group of eight electromagnets, represented by the block 121-2. In the same manner as just described with reference to the first set of photodiodes and electromagnets the second portion of the image is scanned by the second group of eight photodiodes and is reproduced by the second group of eight electromagnets. Similarly, during the following nine-sixtieths of a second, defined by the third through 11th count states of the digital counter 153, the remaining portions of the image 23 are scanned and reproduced by the third through 11th groups of photodiodes and are reproduced by the corresponding groups of electromagnets 65.

Having completed the first scanning sequence, lasting approximately eleven-sixtieths of a second, the digital counter steps through its 12th through 15th count states and then causes the scanning operation to begin anew. A total time of a quarter of a second will have elapsed between the beginning of the first and second scanning intervals and during this time the writing bar 35 will have moved a quarter of an inch and the sheet 21 will have moved a tenth of an inch. The sequential operation of the photodiodes 91 and of the electromagnets 65 introduces a slight skewing effect which is negligible in most applications of the display system disclosed herein. This effect will be understood if it is assumed for sake of discussion that the image is a single line extending transversely across the master sheet 21. As that line travels across the photocells 91 it causes each of them to interrupt its output for a brief period and this interruption is effective to actuate corresponding ones of the electromagnets to be energized. However, the last portion of the line will be sensed eleven-sixtieths of a second after the first portion of that line and by this time the writing bar 35 will have moved nearly a quarter of an inch past the point where it was during the scanning of the initial portion. Thus, the line that will be reproduced on the display board will be in the form of a descending staircase, with each step of the staircase being below the preceding step by the amount traveled by the writing bar 35 during a sixtieth of a second. This staircase effect can be eliminated by displacing each successive group of eight photodiodes 91 in the direction of motion of the sheet 21 by an amount equal to the distance traveled by that sheet during each count state of the counter 153. That is, if for example the photocells 91 are successively actuated in groups of eight from left to right as viewed in FIG. 1, then those groups of photocells would be progressively staggered from left to right so that a straight line extending across the sheet 21 will reach each group of photodiodes at the instant when that group of photodiodes is enabled by the decoder 155.

The same solution can also be effected, of course, by displacing in a similar manner the successive groups of eight electromagnets while leaving the photodiodes 91 in the configuration shown in FIG. 11. In view of the possible desirability to stagger successive groups of the photocells 91 or the electromagnets 65, it should be understood that the term "linear array" when applied to those components is meant to denote that those components are distributed about but do not necessarily lie exactly upon a longitudinal axis.

The exemplary system which has been disclosed shows a stationary display board with an array of electromagnets moving across it from top to bottom. An alternative would be to have the array of electromagnets extending vertically across the board and moving transversely across it from left to right. Moreover, the array of electromagnets, either horizontal or vertical, could be stationary and the desired relative motion between the display board and the array of electromagnets could be achieved by making the display board move past the array of electromagnets while they are being selectively actuated.

What we claim is:

1. A display device comprising in combination:
   a. a board having
      1. a light-transmitting front wall and a rear wall,
      2. an array of closed, mutually isolated ducts of a given color humped along their longitudinal axes and extending through said board between said walls, and
      3. a charge of material of a different color partially filling each of said ducts, the charge in each of said ducts being capable of flowing through said duct individually from one of said walls to the other;
   b. a linear array of actuators arranged in mutually staggered rows extending across the surface of said board in a first direction, each actuator moving when energized, the material in a different group of adjoining ducts relative to said front wall;
   c. means for causing said array to move along said board in a second direction; and
   d. means for sequentially energizing selected combinations of said actuators as said array moves in said second direction.

2. A device for creating against a background of a given color a display of a different color comprising in combination:
   a. a display board having front and rear walls and an array of closed ducts of said given color humped along their longitudinal axes extending through said board between said walls and containing individual charges of magnetic powder of said different color;
   b. a writing bar extending across the front wall of said display board, said writing bar having at least one row of electromagnets extending along its length, each electromagnet moving the magnetic powder in at least one of said ducts toward said front wall;
   c. an erasing magnet extending across the backwall of said display board for concurrently moving the magnetic powder in a plurality of said ducts toward said rear wall;
   d. transporting means for moving said writing bar and said erasing magnet together along said display board; and
   e. commutator means for sequentially and cyclically applying control signals to successive groups of said electromagnets during a selected portion of the travel of said writing bar along said display board.

3. A display device comprising in combination:
   a. a display board having front and rear walls and an array of closed ducts humped along their longitudinal axes extending through said board between said walls and containing individual charges of magnetic powder;
   b. a writing bar extending across the front wall of said display board in a first direction, said writing bar having at least one row of electromagnets extending along its length, each electromagnet moving the magnetic powder in at least one of said ducts toward said front wall;
   c. an erasing bar magnet attached to said writing bar and extending across the backwall of said display board parallel to said at least one row of electromagnets and displaced laterally therefrom, said bar magnet concurrently moving the magnetic powder in a row of said ducts toward said rear wall;
   d. transporting means for moving said writing bar and said bar magnet along said display board from one of its edges to the opposite one of its edges in the opposite direction in which said bar magnet is displaced from said row of electromagnets and then back across said display board toward said one of its edges; and
   e. means for sequentially and cyclically applying control signals to successive groups of said electromagnets while said writing bar is moved toward said opposite one of the edges of said board.

4. A system for reproducing an image from a master sheet comprising in combination:
   a. a board honeycombed by an array of closed, humped ducts containing individual charges of magnetic powder having stable positions at opposite ends of said ducts;
   b. a linear array of photoelectric sensing means arranged in a plurality of mutually staggered rows for producing a plurality of electric signals collectively representing a portion of said image;
   c. a linear array of electromagnets arranged in mutually staggered rows equal in number to said rows of photoelectric sensing means, each said electromagnet moving the magnetic powder in a selected group, consisting of at least one of said ducts, from one of its stable positions to the other in response to a signal from a respective one of said photoelectric sensing means;
   d. commutator means for sequentially applying the outputs of successive groups of said photoelectric sensing means to corresponding groups of said electromagnets; and
   e. means for synchronously moving said master sheet relative to said array of photocells and said array of electromagnets relative to said board.